US012501365B2

(12) United States Patent
Xu et al.

(10) Patent No.: US 12,501,365 B2
(45) Date of Patent: Dec. 16, 2025

(54) METHOD FOR REDUCING POWER CONSUMPTION OF MOBILE TERMINAL AND MOBILE TERMINAL

(71) Applicant: Huawei Technologies Co., Ltd., Shenzhen (CN)

(72) Inventors: Baojun Xu, Xi'an (CN); Weigang Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 461 days.

(21) Appl. No.: 17/812,755

(22) Filed: Jul. 15, 2022

(65) Prior Publication Data

US 2022/0353819 A1 Nov. 3, 2022

Related U.S. Application Data

(63) Continuation of application No. PCT/CN2020/127544, filed on Nov. 9, 2020.

(30) Foreign Application Priority Data

Jan. 15, 2020 (CN) .......................... 202010043528.2

(51) Int. Cl.
*H04W 52/02* (2009.01)
*H04W 4/80* (2018.01)
(Continued)

(52) U.S. Cl.
CPC ......... *H04W 52/0235* (2013.01); *H04W 4/80* (2018.02); *H04W 24/08* (2013.01); *H04W 52/0229* (2013.01); *H04W 76/10* (2018.02)

(58) Field of Classification Search
CPC ... H04W 52/0235; H04W 4/80; H04W 76/10; H04W 24/08; H04W 52/0229
See application file for complete search history.

(56) References Cited

U.S. PATENT DOCUMENTS 7,734,253 B2 6/2010 Chen et al.
2013/0044658 A1* 2/2013 Zhu ................... H04W 52/0229
370/311
(Continued)

FOREIGN PATENT DOCUMENTS

CN 101909347 A 12/2010
CN 103052135 A 4/2013
(Continued)

OTHER PUBLICATIONS

Pyles, A. et al., "Bluesaver: A Multi-PHY Approach to Smartphone Energy Savings", IEEE Transactions on Wireless Communications, XP011584062, Jun. 2015, 11 Pages, vol. 14, No. 6.

*Primary Examiner* — Kevin M Cunningham
(74) *Attorney, Agent, or Firm* — SLATER MATSIL, LLP

(57) ABSTRACT

A method for reducing power consumption of a mobile terminal and a mobile terminal are provided. The method includes: A mobile terminal establishes a Wi-Fi connection to an electronic device by using a Wi-Fi module; the mobile terminal interacts with a server by using the Wi-Fi connection; if the mobile terminal doesn't send or receive a packet within a first time period, the mobile terminal controls the Wi-Fi module to enter a sleep state; and after the Wi-Fi module enters the sleep state, if the mobile terminal needs to send a heartbeat packet, the mobile terminal may establish a Bluetooth connection to the electronic device by using a Bluetooth module, and send the heartbeat packet by using the Bluetooth connection.

18 Claims, 7 Drawing Sheets

(51) Int. Cl.
*H04W 24/08* (2009.01)
*H04W 76/10* (2018.01)

(56) References Cited

U.S. PATENT DOCUMENTS

| | | | |
|---|---|---|---|
| 2014/0273858 A1* | 9/2014 | Panther | A61B 5/02438 |
| | | | 455/41.2 |
| 2015/0382302 A1 | 12/2015 | Davis et al. | |
| 2016/0353382 A1* | 12/2016 | Xue | H04W 52/0251 |
| 2016/0378174 A1 | 12/2016 | Meng et al. | |
| 2017/0257162 A1 | 9/2017 | Panther et al. | |
| 2018/0049122 A1* | 2/2018 | Di Marco | H04W 84/18 |
| 2018/0302861 A1* | 10/2018 | Zhao | H04W 52/0216 |
| 2019/0174412 A1 | 6/2019 | Mahajan et al. | |

FOREIGN PATENT DOCUMENTS

| | | |
|---|---|---|
| CN | 103379197 A | 10/2013 |
| CN | 104244239 A | 12/2014 |
| CN | 104348522 A | 2/2015 |
| CN | 104685937 A | 6/2015 |
| CN | 105050115 A | 11/2015 |
| CN | 105101054 A | 11/2015 |
| CN | 105916100 A | 8/2016 |
| CN | 106255235 A | 12/2016 |
| CN | 106535101 A | 3/2017 |
| CN | 106792954 A | 5/2017 |
| CN | 108270770 A | 7/2018 |
| CN | 108777861 A | 11/2018 |
| CN | 109474969 | 3/2019 |
| CN | 109743619 | 5/2019 |
| CN | 110022495 A | 7/2019 |
| CN | 110557263 A | 12/2019 |
| JP | 2015149579 A | 8/2015 |
| JP | 2017139595 A | 8/2017 |
| JP | 2018502484 A | 1/2018 |
| JP | 2018520572 A | 7/2018 |

* cited by examiner

METHOD FOR REDUCING POWER CONSUMPTION OF MOBILE TERMINAL AND MOBILE TERMINAL

CROSS-REFERENCE TO RELATED APPLICATIONS

This application is a continuation of International Application No. PCT/CN2020/127544, filed on Nov. 9, 2020, which claims priority to Chinese Patent Application No. 202010043528.2, filed on Jan. 15, 2020. The disclosures of the aforementioned applications are hereby incorporated by reference in their entireties.

TECHNICAL FIELD

This application relates to the field of mobile terminal technologies, and in particular, to a method for reducing power consumption of a mobile terminal and a mobile terminal.

BACKGROUND

With the development of electronic technologies, mobile terminals provide increasingly more functions, enriching people's lives. When using an application on a mobile terminal, a user usually needs to access a network, to be specific, establish, by using one or more networks, a communication connection to a server corresponding to the application.

Wi-Fi has a lower tariff and a higher network speed. Therefore, Wi-Fi is preferred for users to access the network. The mobile terminal may establish, by using a configured Wi-Fi module, a communication connection to the server in a connection manner of a wireless local area network (for example, a Wi-Fi network) by using the internet or a mobile communications network. Alternatively, the mobile terminal establishes, by using a Wi-Fi module, a communication connection to an accompanying Wi-Fi device (or referred to as a mobile Wi-Fi device) in a connection manner of a wireless local area network (for example, a Wi-Fi network), and accesses a mobile communications network by using the accompanying Wi-Fi device, to interact with the server.

As a network access time of the user increases, a working time of the Wi-Fi module also extends, and power consumption of the Wi-Fi module is very high. It can be learned that power consumption of the Wi-Fi module is one of important indicators that affect a battery life of the mobile terminal. Therefore, how to reduce the power consumption of the Wi-Fi module in the mobile terminal is always a hot topic researched by manufacturers.

SUMMARY

This application provides a method for reducing power consumption of a mobile terminal and a mobile terminal, to reduce power consumption of a Wi-Fi module in the mobile terminal, thereby helping prolong a standby time of the mobile terminal.

To achieve the foregoing objective, embodiments of this application provide the following technical solutions.

According to a first aspect, a method for reducing power consumption of a mobile terminal is provided. The mobile terminal has a Wi-Fi module and a Bluetooth module. The method includes: The mobile terminal establishes a Wi-Fi connection to an electronic device by using the Wi-Fi module, and the mobile terminal interacts with a server by using the Wi-Fi connection. If the mobile terminal does not send or receive a packet within a first time period, the mobile terminal controls the Wi-Fi module to enter a sleep state, where the packet includes a first packet and a second packet, or the packet includes a second packet. The first packet is a heartbeat packet or a packet used to establish a transport layer link, and the second packet is a packet other than the first packet. After the Wi-Fi module enters the sleep state, if the mobile terminal has a to-be-sent first packet, the mobile terminal sends the to-be-sent first packet by using a Bluetooth connection established by the Bluetooth module to the electronic device.

It can be learned that, when the Wi-Fi module of the mobile terminal is in the sleep state, if the mobile terminal only needs to send the first packet, the mobile terminal does not wake up the Wi-Fi module, but wakes up the Bluetooth module having lower power consumption than the Wi-Fi module, and sends the first packet in a Bluetooth mode, to reduce power consumption of the Wi-Fi module. In this way, overall power consumption of the mobile terminal is reduced, and a battery life of the mobile terminal is prolonged.

In a possible implementation, the method further includes: After the Wi-Fi module enters the sleep state, if the mobile terminal has the to-be-sent first packet, the mobile terminal wakes up the Bluetooth module, and establishes the Bluetooth connection to the electronic device by using the Bluetooth module.

In some examples, after the Wi-Fi module enters the sleep state, the mobile terminal starts to establish the Bluetooth connection to the electronic device. Alternatively, after the Wi-Fi module enters the sleep state, the mobile terminal establishes the Bluetooth connection to the electronic device only when determining that a first packet needs to be sent. In some other examples, the mobile terminal may alternatively establish the Bluetooth connection to the electronic device before the Wi-Fi module enters the sleep state. Therefore, a plurality of occasions for establishing the Bluetooth connection between the mobile terminal and the electronic device are provided.

In a possible implementation, the method further includes: After the mobile terminal sends the to-be-sent first packet, if the mobile terminal does not send or receive another packet within a second time period, the mobile terminal controls the Bluetooth module to enter a sleep state. This helps further reduce power consumption of the Bluetooth module.

In a possible implementation, the Bluetooth connection is a classic Bluetooth connection or a Bluetooth low energy connection.

In a possible implementation, the electronic device is any one of a wireless router, an accompanying Wi-Fi device, or a mobile terminal with a hotspot capability.

In a possible implementation, after the Wi-Fi module enters the sleep state, the method further includes: If the mobile terminal has a to-be-sent second packet or a to-be-received second packet, the mobile terminal wakes up the Wi-Fi module, reestablishes a Wi-Fi connection between the mobile terminal and the electronic device by using the Wi-Fi module, and transmits the second packet by using the Wi-Fi connection, and the mobile terminal retains or disconnects the Bluetooth connection between the mobile terminal and the electronic device.

In a possible implementation, after the Wi-Fi module enters the sleep state, if the mobile terminal has a to-be-sent first packet, before the mobile terminal sends the to-be-sent first packet by using the Bluetooth connection established by the Bluetooth module to the electronic device, the method further includes: The mobile terminal receives an indication for enabling a first function from a user, or the mobile terminal enables the first function when determining that a first condition is met, where the first function is a function of reducing power consumption of the mobile terminal, and the first condition includes: a battery level of the mobile terminal is less than a preset value, a quantity of applications enabled by the mobile terminal is greater than a preset quantity, and the mobile terminal enables any one or more of preset applications.

In a possible implementation, the heartbeat packet is a heartbeat packet exchanged between the mobile terminal and the server.

According to a second aspect, a method for reducing power consumption of a mobile terminal is provided. An electronic device has a Wi-Fi module and a Bluetooth module, and the electronic device establishes a communication connection to a server. The method includes: The electronic device respectively establishes Wi-Fi connections to N mobile terminals by using the Wi-Fi module, so that the N mobile terminals interact with the server by using the Wi-Fi connections. If Wi-Fi modules of M mobile terminals in the N mobile terminals enter a sleep state, the electronic device respectively establishes Bluetooth connections to the M mobile terminals by using the Bluetooth module, to transmit to-be-sent or to-be-received first packets of the M mobile terminals. The first packet is a heartbeat packet or a packet used to establish a transport layer link, M and N are positive integers, and M is less than or equal to N. Therefore, power consumption of the M mobile terminals is reduced.

In a possible implementation, after the Wi-Fi modules of the M mobile terminals in the N mobile terminals enter the sleep state, where M is less than N, the method further includes: The electronic device transmits, by using a Wi-Fi connection, packets to be sent or to be received by mobile terminals other than the M mobile terminals and whose Wi-Fi modules do not enter the sleep state.

In a possible implementation, the method further includes: If all Wi-Fi modules of the N mobile terminals enter the sleep state, that is, if M is equal to N, the electronic device controls the Wi-Fi module of the electronic device to enter the sleep state.

In a possible implementation, the Bluetooth connection is a classic Bluetooth connection or a Bluetooth low energy connection.

In a possible implementation, the electronic device is any one of a wireless router, an accompanying Wi-Fi device, or a mobile terminal with a hotspot capability.

In a possible implementation, the heartbeat packet is a heartbeat packet exchanged between the mobile terminal and the server.

According to a third aspect, a mobile terminal is provided, including a processor, a memory, a touchscreen, a Wi-Fi module, and a Bluetooth module. The memory, the touchscreen, the Wi-Fi module, and the Bluetooth module are coupled to the processor, and the memory is configured to store computer program code. The computer program code includes computer instructions, and when the processor reads the computer instructions from the memory, the mobile terminal performs the method according to any one of the foregoing aspects and the possible implementations of the foregoing aspects.

According to a fourth aspect, an electronic device is provided, including a processor, a memory, a Wi-Fi module, and a Bluetooth module. The memory, the Wi-Fi module, and the Bluetooth module are coupled to the processor, and the memory is configured to store computer program code. The computer program code includes computer instructions, and when the processor reads the computer instructions from the memory, the electronic device performs the method according to any one of the foregoing aspects and the possible implementations of the foregoing aspects.

According to a fifth aspect, an apparatus is provided. The apparatus is included in a mobile terminal, and the apparatus has a function of implementing behavior of the mobile terminal in any method in the foregoing aspects and the possible implementations of the foregoing aspects. The function may be implemented by hardware, or may be implemented by hardware executing corresponding software. The hardware or the software includes at least one module or unit corresponding to the foregoing function, for example, a communication module or unit, or a control module or unit.

According to a sixth aspect, an apparatus is provided. The apparatus is included in an electronic device, and the apparatus has a function of implementing behavior of the electronic device in any method in the foregoing aspects and the possible implementations of the foregoing aspects. The function may be implemented by hardware, or may be implemented by hardware executing corresponding software. The hardware or the software includes at least one module or unit corresponding to the foregoing function, for example, a communication module or unit, or a control module or unit.

According to a seventh aspect, a computer readable storage medium is provided, including computer instructions. When the computer instructions are run on a mobile terminal, the mobile terminal performs the method according to any one of the foregoing aspects and the possible implementations of the foregoing aspects.

According to an eighth aspect, a computer readable storage medium is provided, including computer instructions. When the computer instructions are run on an electronic device, the electronic device performs the method according to any one of the foregoing aspects and the possible implementations of the foregoing aspects.

According to a ninth aspect, a computer program product is provided. When the computer program product runs on a computer, the computer performs the method according to any one of the foregoing aspects and the possible implementations of the foregoing aspects.

According to a tenth aspect, a chip system is provided, including a processor. When the processor executes instructions, the processor performs the method according to any one of the foregoing aspects and the possible implementations of the foregoing aspects.

DETAILED DESCRIPTION OF ILLUSTRATIVE EMBODIMENTS

Figure 1:
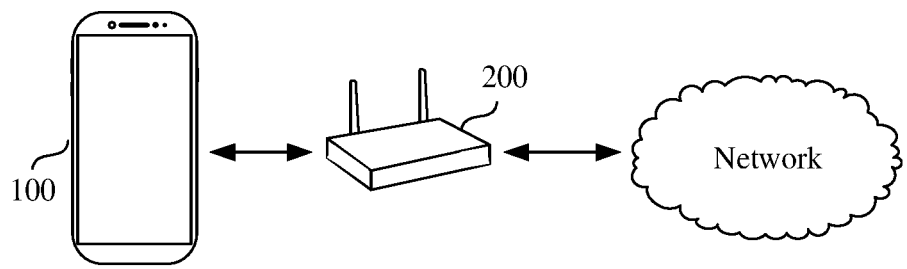
FIG. 1 is a schematic structural diagram of a communications system according to an embodiment of this application.

In the embodiments of this application, words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Exactly, use of the words such as "example" or "for example" is intended to present a relative concept in a specific manner.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

Applications installed on a mobile terminal generally provide rich functions for a user. When using the application on the mobile terminal, the user usually needs to access a network, to be specific, establish, by using one or more networks, a communication connection to a server corresponding to the application. Currently, the mobile terminal may establish, by using a configured modem, a communication connection to the server in a wireless communication connection manner such as 2G/3G/4G/5G by using a mobile communications network. Alternatively, the mobile terminal may establish, by using a configured Wi-Fi module, a communication connection to the server in a connection manner of a wireless local area network (for example, a Wi-Fi network) by using the internet or a mobile communications network. In an example, the mobile terminal establishes a communication connection to a wireless router by using a Wi-Fi wireless connection technology, and accesses the internet by using the wireless router, to interact with the server. Alternatively, the mobile terminal establishes a communication connection to an accompanying Wi-Fi device (or referred to as a mobile Wi-Fi device) by using a Wi-Fi wireless connection technology, and accesses a mobile communications network by using the accompanying Wi-Fi device, to interact with the server.

Wi-Fi has a lower tariff and a higher network speed. Therefore, Wi-Fi is preferred for network access. It can be learned that power consumption of the Wi-Fi module is one of important indicators that affect a battery life of the mobile terminal. Currently, some solutions have been used to reduce the power consumption of the Wi-Fi module. For example, when the mobile terminal has no data transmission, the Wi-Fi module may be controlled to enter a sleep state. Subsequently, when the mobile terminal has data transmission, the Wi-Fi module is woken up to continue to work.

It may be noted that after the Wi-Fi module enters the sleep state, because a large quantity of applications are installed on the mobile terminal, the Wi-Fi module is frequently woken up when these applications send heartbeat packets. In the embodiments of this application, when an application sends a heartbeat packet, the mobile terminal does not wake up the Wi-Fi module, but wakes up a Bluetooth module having lower power consumption than the Wi-Fi module, and sends a heartbeat packet of each application in a Bluetooth mode, to reduce the power consumption of the Wi-Fi module. In this way, overall power consumption of the mobile terminal is reduced, and the battery life of the mobile terminal is prolonged.

FIG. 1 is a schematic structural diagram of a communications system according to an embodiment of this application. The communications system includes a mobile terminal 100 and an electronic device 200. Various applications may be installed and run on the mobile terminal 100, to provide rich functions for a user. Generally, the mobile terminal 100 may access the internet or a mobile communications network through the electronic device 200, to communicate with a server corresponding to each application.

For example, the mobile terminal 100 in this application may be a mobile phone, a tablet computer, a personal computer (PC), a personal digital assistant (PDA), a smartwatch, a netbook, a wearable electronic device, an augmented reality (AR) device, a virtual reality (VR) device, a vehicle-mounted device, a smart car, a smart stereo, a robot, and the like. A specific form of the mobile terminal is not specifically limited in this application.

Figure 2A:
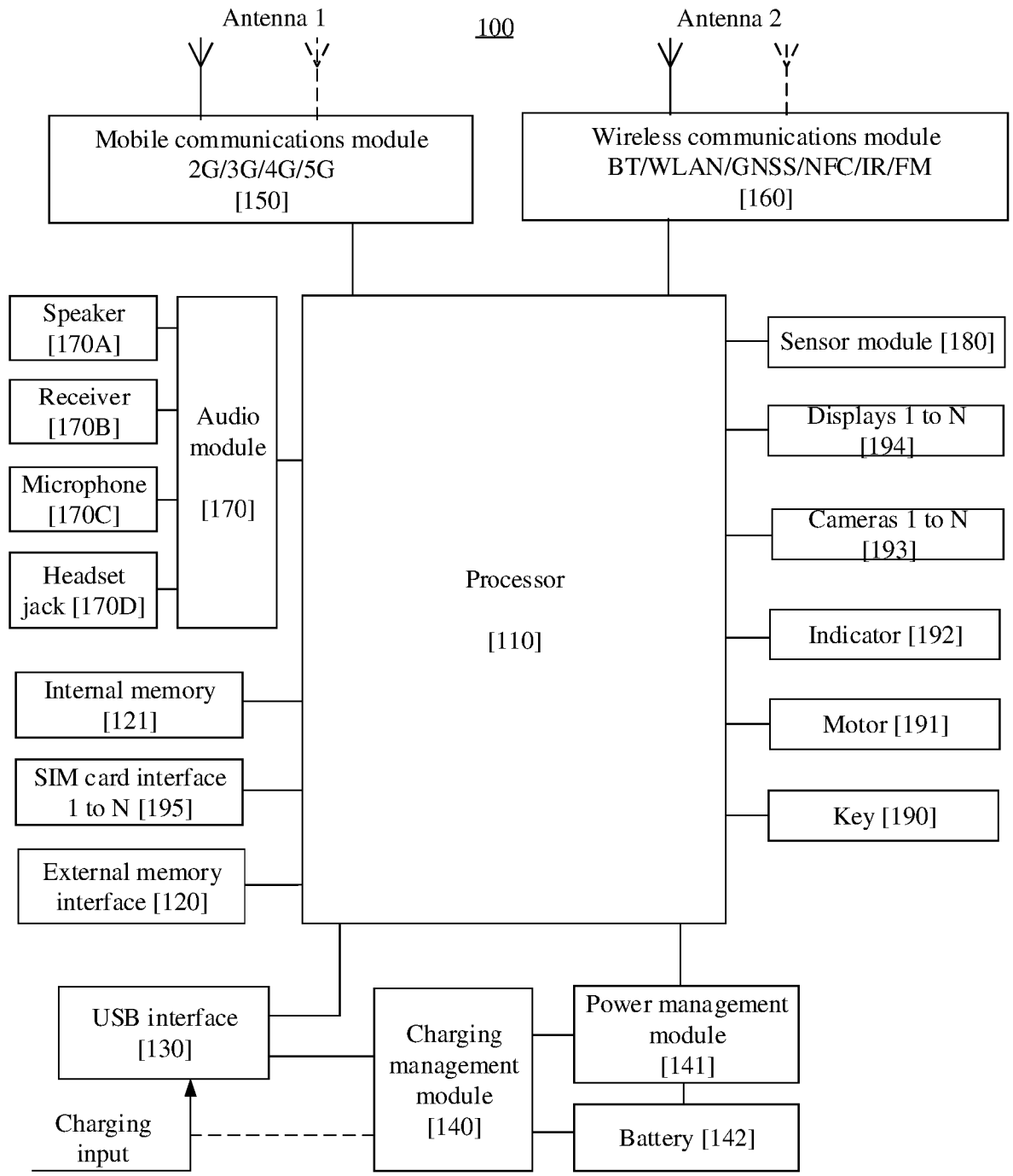
FIG. 2A is a schematic structural diagram 1 of a mobile terminal according to an embodiment of this application.

FIG. 2A is a schematic structural diagram of the mobile terminal 100. The mobile terminal 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of the present invention constitutes no specific limitation on the mobile terminal 100. In some other embodiments of this application, the mobile terminal 100 may include more or fewer components than those shown in the figure, or combine some components, or split some components, or have different component arrangements. The illustrated components may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data that is used or cyclically used by the processor 110. If the processor 110 needs to use the instructions or the data again, the instructions or the data may be invoked directly from the memory. This avoids repeated access and reduces a waiting time of the processor 110, thereby improving efficiency of the system.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus that includes a serial data line (SDA) and a serial clock line (SCL). In some embodiments, the processor 110 may include a plurality of I2C buses. The processor 110 may be separately coupled to the touch sensor, a charger, a flash, the camera 193, and the like by using different I2C bus interfaces. For example, the processor no may be coupled to the touch sensor by using an I2C interface, so that the processor no communicates with the touch sensor by using the I2C bus interface, to implement a touch function of the mobile terminal 100.

The I2S interface may be used for audio communication. In some embodiments, the processor no may include a plurality of I2S buses. The processor no may be coupled to the audio module 170 by using an I2S bus, to implement communication between the processor no and the audio module 170. In some embodiments, the audio module 170 may transmit an audio signal to the wireless communication module 160 by using the I2S interface, to implement a function of answering a call by using a Bluetooth headset.

The PCM interface may also be used for audio communication to sample, quantize, and encode an analog signal. In some embodiments, the audio module 170 and the wireless communication module 160 may be coupled by using a PCM bus interface. In some embodiments, the audio module 170 may alternatively transmit an audio signal to the wireless communication module 160 by using the PCM interface, to implement a function of answering a call by using a Bluetooth headset. Both the I2S interface and the PCM interface may be used for audio communication.

The UART interface is a universal serial data bus used for asynchronous communication. The bus may be a bidirectional communications bus. The bus implements conversion between serial communication and parallel communication for data to be transmitted. In some embodiments, the UART interface is generally configured to connect the processor no to the wireless communication module 160. For example, the processor no communicates with a Bluetooth module in the wireless communication module 160 by using the UART interface, to implement a Bluetooth function. In some embodiments, the audio module 170 may transmit an audio signal to the wireless communication module 160 by using the UART interface, to implement a function of playing music by using a Bluetooth headset.

The MIPI interface may be configured to connect the processor 110 to peripheral devices such as the display 194 and the camera 193. The MIPI interface includes a camera serial interface (CSI), a display serial interface (DSI), and the like. In some embodiments, the processor 110 communicates with the camera 193 by using the CSI interface, to implement a photographing function of the mobile terminal 100. The processor 110 communicates with the display 194 by using the DSI interface, to implement a display function of the mobile terminal 100.

The GPIO interface may be configured by software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and may be specifically a Mini USB interface, a Micro USB interface, a USB Type C interface, or the like. The USB interface 130 may be configured to connect to the charger to charge the mobile terminal 100, or may be configured to transmit data between the mobile terminal 100 and a peripheral device. The USB interface 130 may alternatively be configured to connect to a headset, to play audio by using the headset. The interface may alternatively be configured to connect to another mobile terminal, for example, an AR device.

It may be understood that the interface connection relationship between modules shown in this embodiment of the present invention is merely an example for description, and does not constitute a structural limitation on the mobile terminal 100. In some other embodiments of this application, the mobile terminal 100 may alternatively use an interface connection manner different from that in the foregoing embodiment, or a combination of a plurality of interface connection manners.

The charging management module 140 is configured to receive charging input from the charger. The charger may be a wireless charger or a wired charger. In some wired charging embodiments, the charging management module 140 may receive charging input from the wired charger by using the USB interface 130. In some wireless charging embodiments, the charging management module 140 may receive wireless charging input by using a wireless charging coil of the mobile terminal 100. When charging the battery 142, the charging management module 140 may further supply power to the mobile terminal by using the power management module 141.

The power management module 141 is configured to connect the battery 142, the charging management module 140, and the processor 110. The power management module 141 receives input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the mobile terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile terminal 100 may be configured to cover a single or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the mobile terminal 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and transmit the received electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transmitted to the application processor. The application processor outputs an audio signal by using an audio device (not limited to the speaker 170A, the receiver 170B, or the like), or display an image or a video by using the display 194. In some embodiments, the modem processor may be an independent device. In some other embodiments, the modem processor may be independent of the processor 110, and disposed in a same device with the mobile communication module 150 or another function module.

The wireless communication module 160 may provide a wireless communication solution that is applied to the mobile terminal 100 and that includes a wireless local area network (WLAN) (for example, a Wireless Fidelity (Wi-Fi) network), Bluetooth (BT), a global navigation satellite system (GNSS), frequency modulation (FM), near field communication (NFC), infrared (IR), or the like. The wireless communication module 160 may be one or more devices integrating at least one communication processing module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave by using the antenna 2 for radiation.

In some embodiments of this application, when determining that all applications have no data transmission, the processor 110 may indicate a WLAN module (for example, a Wi-Fi module) in the wireless communication module to enter a sleep state. When the WLAN module is in the sleep state, if an application needs to send a heartbeat packet, the processor 110 indicates a BT module in the wireless communication module to establish a communication connection between the mobile terminal 100 and the electronic device 200, and send a heartbeat packet of each application by using the communication connection. When determining that one or more applications need to send data (non-heartbeat packets), the processor 110 wakes up the WLAN module, establishes a WLAN connection between the mobile terminal 100 and the electronic device, and transmits the data of the one or more applications by using the WLAN connection. In other words, when the application on the mobile terminal 100 only needs to send the heartbeat packet, the mobile terminal 100 does not wake up the WLAN module, but establishes the communication connection by using the BT module having lower power consumption than the WLAN module. In this way, power consumption of the WLAN module is reduced, and overall power consumption of the mobile terminal 100 is reduced.

In some embodiments, the antenna 1 of the mobile terminal 100 is coupled to the mobile communication module 150, and the antenna 2 is coupled to the wireless communication module 160, so that the mobile terminal 100 can communicate with a network and another device by using a wireless communications technology. The wireless communications technology may include a technology such as a Global System for Mobile Communications (GSM), a general packet radio service (GPRS), Code Division Multiple Access (CDMA), Wideband Code Division Multiple Access (WCDMA), Time-Division Code Division Multiple Access (TD-SCDMA), Long Term Evolution (LTE), BT, GNSS, WLAN, NFC, FM, and/or IR. The GNSS may include a global positioning system (GPS), a global navigation satellite system (GLONASS), a BeiDou navigation satellite system (BDS), a quasi-zenith satellite system (QZSS), and/or a satellite-based enhancement system (SBAS).

The mobile terminal 100 implements a display function by using the GPU, the display 194, the application processor, and the like. The GPU is a microprocessor for image processing, and is connected to the display 194 and the application processor. The GPU is configured to perform mathematical and geometric calculations for graphics rendering. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the mobile terminal 100 may include one or N displays 194, where N is a positive integer greater than 1.

The mobile terminal 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, and an optical signal is converted into an electrical signal. The photosensitive element of the camera transmits the electrical signal to the ISP for processing, so that the ISP converts the electrical signal into an image visible to naked eyes. The ISP can further perform algorithm optimization on noise, brightness, and a skin color of the image. The ISP can further optimize parameters of a photographing scene, such as an exposure and a color temperature. In some embodiments, the ISP may be disposed in the camera 193.

The camera 193 is configured to capture a static image or a video. The lens generates an optical image for an object, and the optical image is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the mobile terminal 100 may include one or N cameras 193, where N is a positive integer greater than 1.

The digital signal processor is configured to process a digital signal, and can process another digital signal in addition to the digital image signal. For example, when the mobile terminal 100 selects a frequency, the digital signal processor is configured to perform Fourier transform on energy of the frequency.

The video codec is configured to compress or decompress a digital video. The mobile terminal 100 may support one or more video codecs. In this way, the mobile terminal 100 may play or record videos in a plurality of encoding formats, for example, moving picture experts group (MPEG)-1, MPEG-2, MPEG-3, and MPEG-4.

The NPU is a neural network (NN) computing processor. By drawing on the experience of a structure of a biological neural network, for example, by drawing on the experience of a transmission mode between human brain neurons, the NPU quickly processes input information, and can further continuously perform self-learning. The NPU may be used to implement an application such as intelligent cognition of the mobile terminal 100, for example, image recognition, facial recognition, speech recognition, and text understanding.

The external memory interface 120 may be configured to connect to an external memory card such as a micro SD card, to expand a storage capability of the mobile terminal 100. The external memory card communicates with the processor no by using the external memory interface 120, to implement a data storage function. For example, a file such as music or a video is stored in the external memory card.

The internal memory 121 may be configured to store computer executable program code, and the executable program code includes instructions. The internal memory 121 may include a program storage area and a data storage area. The program storage area may store an operating system, an application program required by at least one function (for example, a sound playing function or an image playing function), and the like. The data storage area may store data (for example, audio data or an address book) created in a process of using the mobile terminal 100, and the like. In addition, the internal memory 121 may include a high-speed random access memory, and may further include a non-volatile memory, such as at least one magnetic disk storage device, a flash memory device, or a universal flash storage (universal flash storage, UFS). The processor 110 executes various functional applications and data processing of the mobile terminal 100 by running the instructions stored in the internal memory 121 and/or the instructions stored in the memory disposed in the processor.

The mobile terminal 100 may implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The mobile terminal 100 may be used to listen to music or listen to a hands-free call by using the speaker 170A.

The receiver 170B, also referred to as an "earpiece", is configured to convert an audio electrical signal into a sound signal. When the mobile terminal 100 is used to answer a call or listen to voice information, a voice may be listened to by placing the receiver 170B close to a human ear.

The microphone 170C, also referred to as a "mic" or a "mike", is configured to convert a sound signal into an electrical signal. When making a call or sending voice information, a user may place the microphone 170C close to a human mouth and make a sound, to input a sound signal to the microphone 170C. At least one microphone 170C may be disposed in the mobile terminal 100. In some other embodiments, two microphones 170C may be disposed in the mobile terminal 100. In addition to collecting a sound signal, the microphones may further implement a noise reduction function. In some other embodiments, three, four, or more microphones 170C may be disposed in the mobile terminal 100, to collect a sound signal, reduce noise, identify a sound source, implement a directional recording function, and the like.

The headset jack 170D is configured to connect to a wired headset. The headset jack 170D may be the USB interface 130, or may be a 3.5 mm Open Mobile Terminal Platform (OMTP) standard interface or a Cellular Telecommunications Industry Association of the USA (CTIA) standard interface.

The key 190 includes a power key, a volume key, or the like. The key 190 may be a mechanical key, or may be a touch key. The mobile terminal 100 may receive a key input, and generate a key signal input related to user setting and function control of the mobile terminal 100.

The motor 191 may generate a vibration alert. The motor 191 may be configured to generate a vibration alert for an incoming call, or generate a vibration feedback for a touch operation. For example, touch operations performed on different applications (for example, photographing and audio playback) may correspond to different vibration feedback effects. The motor 191 may further enable touch operations performed on different areas of the display 194 to correspond to different vibration feedback effects. Different application scenarios (for example, a time reminder, information receiving, an alarm clock, and a game) may also correspond to different vibration feedback effects. A vibration feedback effect for a touch operation may alternatively be customized.

The indicator 192 may be an indicator lamp, and may be configured to indicate a charging status and a power change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the mobile terminal 100. The mobile terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 may be compatible with different types of SIM cards. The SIM card interface 195 may also be compatible with an external memory card. The mobile terminal 100 interacts with a network by using the SIM card, to implement functions such as a call and data communication. In some embodiments, the mobile terminal 100 uses an eSIM, namely, an embedded SIM card. The eSIM card may be embedded in the mobile terminal 100, and cannot be separated from the mobile terminal 100.

A software system of the mobile terminal 100 may use a layered architecture, an event-driven architecture, a microkernel architecture, a microservice architecture, or a cloud architecture. In this embodiment of the present invention, an Android system with the layered architecture is used as an example to describe a software structure of the mobile terminal 100.

Figure 2B:
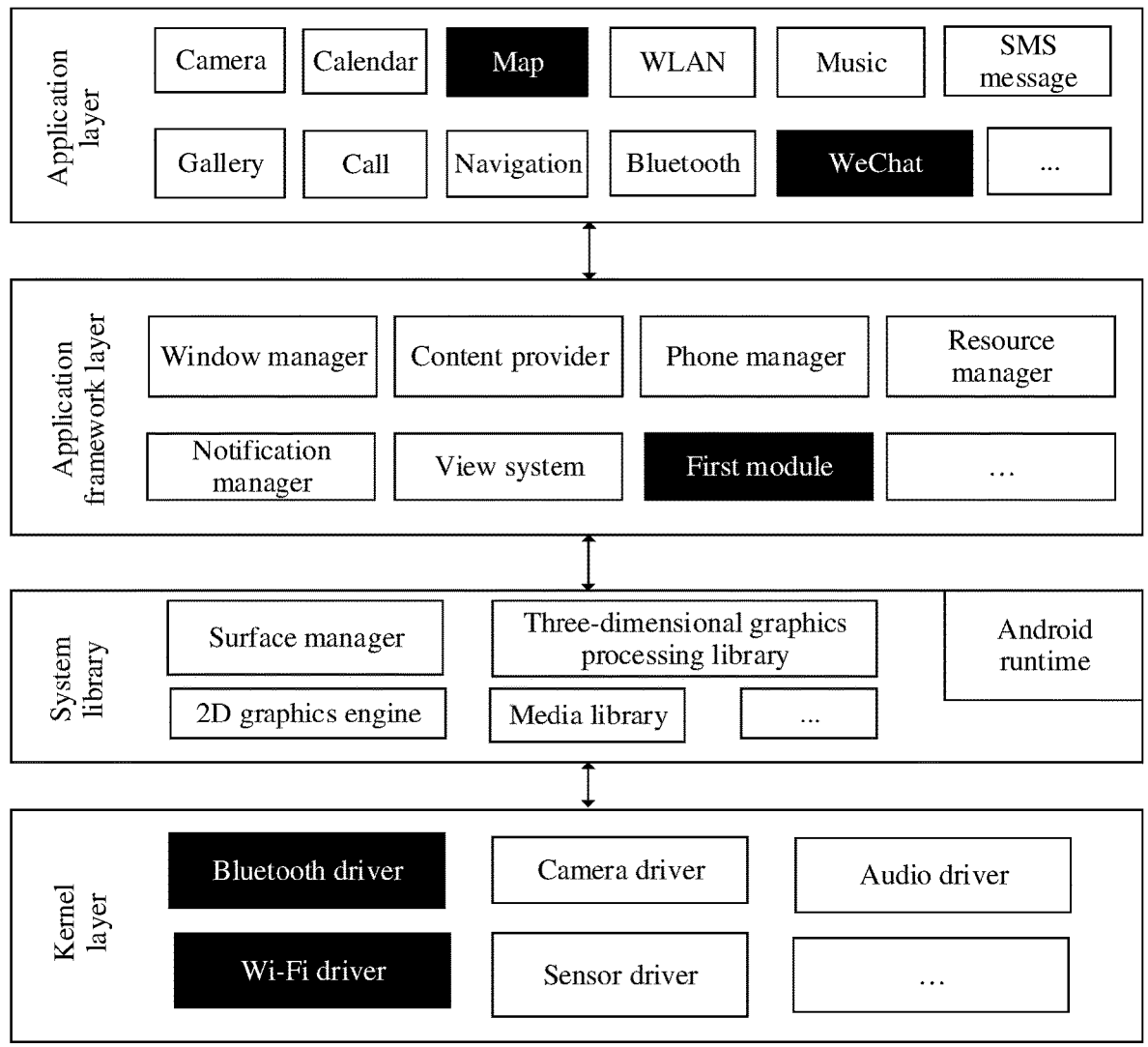
FIG. 2B is a schematic structural diagram 2 of a mobile terminal according to an embodiment of this application.

FIG. 2B is a block diagram of the software structure of the mobile terminal 100 according to this embodiment of the present invention.

In the layered architecture, software is divided into a plurality of layers, and each layer has a clear role and responsibility. Layers communicate with each other by using a software interface. In some embodiments, the Android system is divided into four layers, which are respectively an application layer, an application framework layer, an Android runtime (Android runtime) and a system library, and a kernel layer from top to bottom.

As shown in FIG. 2B, the application layer may include a series of application packages, including an application preconfigured before the mobile terminal is delivered from the factory, or an application installed by a user in, for example, an application marketplace or another manner after the mobile terminal is delivered from the factory. These applications include but are not limited to applications such as Camera, Gallery, Calendar, Phone, Map, Navigation, WLAN, Bluetooth, Music, Video, SMS message, Browser, WeChat, Taobao, and Alipay (only some are shown in the figure). Most of these applications require network access, for example, Navigation, a Browser, WeChat, Taobao, and Alipay.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like. The window manager is configured to manage a window program. The window manager can obtain a display size, determine whether there is a status bar, lock a screen, capture a screen, and the like. The content provider is configured to store and obtain data and make the data accessible to an application. The data may include a video, an image, audio, calls made and answered, browsing history and a bookmark, an address book, and the like. The view system includes a visual control, for example, a control for displaying a text and a control for displaying a picture. The view system may be configured to build an application. A display interface may include one or more views. For example, a display interface that includes an SMS notification icon may include a view for displaying a text and a view for displaying a picture. The phone manager is configured to provide a communication function of the mobile terminal 100, for example, call status management (including call connection and disconnection, and the like). The resource manager provides an application with various resources, such as a localized string, an icon, a picture, a layout file, and a video file. The notification manager enables an application to display notification information in the status bar, which may be used to convey a notification-type message that can automatically disappear after a short stay without user interaction. For example, the notification manager is configured to indicate download completion, provide a message reminder, and the like. The notification manager may further provide a notification that appears on the status bar at the top of the system in a form of a chart or a scroll bar text, for example, a notification of an application running in the background, and may further provide a notification that appears on the screen in a form of a dialog window. For example, text information is displayed on the status bar, an alert tone is played, the mobile terminal vibrates, and the indicator lamp blinks.

In some embodiments of this application, the application framework layer may further include a first module, configured to collect a data packet sent by each application at the application layer to the server, and determine, based on a type of the data packet, whether to wake up the Wi-Fi module or wake up the Bluetooth module. For example, when determining that none of the applications at the application layer sends a packet within a specific time period, the first module may indicate, by using a Wi-Fi driver at the kernel layer, the Wi-Fi module to sleep. For another example, when determining that an application at the application layer needs to send a heartbeat packet, the first module may wake up the Bluetooth module by using a Bluetooth driver at the kernel layer, and send the heartbeat packet by using a link established by the Bluetooth module. If the Bluetooth module is not in the sleep state, the heartbeat packet may be directly sent by using the link established by the Bluetooth module. For another example, when determining that an application at the application layer needs to send a packet (non-heartbeat packet), the first module may wake up the Wi-Fi module by using the Wi-Fi driver at the kernel layer, and send the packet of the application by using a link established by the Wi-Fi module.

In another embodiment of this application, the first module may be further configured to collect heartbeat packets of the applications at the application layer, and send the heartbeat packets of the applications in a centralized manner within a period of time. In addition, when the heartbeat packets of the applications are sent in the centralized manner, the Bluetooth module is woken up by using the Bluetooth driver at the kernel layer, and the heartbeat packets are sent by using the Bluetooth link.

In some other embodiments of this application, the first module may be further configured to identify a packet (such as a device ID, a device IP address, a port number and information about a used protocol, or a TCP link establishment packet) used to establish a transport layer link between the mobile terminal 100 and the electronic device 200, wake up the Bluetooth module, and transmit, by using the Bluetooth link, the packet used to establish the transport layer link. It should be noted that in this case, only a physical layer link is established for the Bluetooth link, and no transport layer link is established. For example, a control packet (such as a packet used to broadcast an address of the mobile terminal 100) between the mobile terminal 100 and the electronic device 200 may carry a packet of the transport layer link. In other words, the transport layer link may be established in advance. Subsequently, when the mobile terminal needs to establish a Bluetooth link or a Wi-Fi link, after establishing a corresponding physical layer link, the mobile terminal may directly use the transport layer link established in advance. In the conventional technology, after a physical layer Wi-Fi link or a physical layer Bluetooth link is established, a transport layer link needs to be further established to transmit a packet. In the method in this embodiment of this application, compared with the conventional technology, because the transport layer link is established in advance, after the mobile terminal wakes up the Wi-Fi module or the Bluetooth module, packet transmission may be quickly started, thereby improving work efficiency of the Wi-Fi module or the Bluetooth module, and helping reduce power consumption of the Wi-Fi module or the Bluetooth module. Therefore, the overall power consumption of the mobile terminal is reduced.

The Android runtime includes a kernel library and a virtual machine. The Android runtime schedules and manages the Android system.

The kernel library includes two parts: one is a function that the Java language needs to invoke, and the other is a kernel library of Android.

The application layer and the application framework layer run in the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide a fusion of 2D and 3D layers for a plurality of applications.

The media library supports playback and recording of various common audio and video formats, a static image file, and the like. The media library can support various audio and video coding formats, such as MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The electronic device 200 in this application is a device that can provide a wireless network access function for the mobile terminal 100, for example, a wireless router, a portable Wi-Fi device (also referred to as an accompanying Wi-Fi device or a mobile Wi-Fi device), or customer premises equipment (CPE), or may be a device that provides a hotspot for the mobile terminal 100, for example, may be a mobile phone or a tablet computer. In this application, the electronic device 200 has a Bluetooth module, and the Bluetooth module can provide a classic Bluetooth (or referred to as conventional Bluetooth) function and/or a Bluetooth low energy function.

It should be noted that for a structure of the electronic device 200, refer to the structure of the mobile terminal 100 in FIG. 2A. The electronic device 200 may have more or fewer components than the structure shown in FIG. 2A, or combine some components, or split some components, or have different component arrangements. The illustrated components may be implemented in hardware, software, or a combination of software and hardware.

For example, when the electronic device 200 is a router, the electronic device 200 may include a processor, a memory, a wireless communication module, an antenna, a power module, a network access module configured to connect to the internet, and the like. The wireless communication module includes a Wi-Fi module and a Bluetooth module. The Wi-Fi module may be configured to establish a Wi-Fi connection to the mobile terminal 100. In this way, the mobile terminal 100 may access the internet by using the network access module of the electronic device 200. The Bluetooth module may be configured to establish a Bluetooth connection (a classic Bluetooth connection or a BLE connection) to the mobile terminal 100, so that the mobile terminal 100 can access the internet by using the network access module of the electronic device 200.

For other content, refer to descriptions of related structures of the mobile terminal 100 in FIG. 2A. Details are not described herein.

For another example, when the electronic device 200 is an accompanying Wi-Fi device, the electronic device 200 may include a processor, a memory, a wireless communication module, an antenna, a power module, a mobile communication module, and the like. The mobile communication module may be configured to provide a wireless communication solution that is applied to the electronic device 100 and that includes 2G/3G/4G/5G or the like.

The wireless communication module includes a Wi-Fi module and a Bluetooth module. The Wi-Fi module may be configured to establish a Wi-Fi connection to the mobile terminal 100. In this way, the mobile terminal 100 may access the mobile communications network by using the mobile communication module of the electronic device 200. The Bluetooth module may be configured to establish a Bluetooth connection (a classic Bluetooth connection or a BLE connection) to the mobile terminal 100, so that the mobile terminal 100 can access the mobile communications network by using the mobile communication module of the electronic device 200.

For other content, refer to descriptions of related structures of the mobile terminal 100 in FIG. 2A. Details are not described herein.

All technical solutions in the following embodiments may be implemented in the mobile terminal 100 having the foregoing hardware architecture and software architecture.

The following describes in detail the technical solutions provided in the embodiments of this application with reference to the accompanying drawings.

For example, by default, a mobile terminal may always use a method provided in an embodiment of this application, to reduce power consumption of the mobile terminal. Alternatively, by default, in a specific scenario, a mobile terminal may use a method provided in an embodiment of this application, to reduce power consumption of the mobile terminal. For example, by default, when a battery level is less than a preset value (for example, the battery level is less than 20%), the mobile terminal may automatically start to use the method provided in the embodiment of this application, to reduce the power consumption of the mobile terminal. For another example, by default, when a quantity of enabled applications is greater than a preset quantity (for example, 5), the mobile terminal may automatically start to use the method provided in the embodiment of this application, to reduce the power consumption of the mobile terminal. For another example, when determining that the mobile terminal enables a specific application (for example, the specific application is an application that needs to frequently send a heartbeat packet, for example, an instant messaging application), the mobile terminal automatically starts to use the method provided in the embodiment of this application, to reduce the power consumption of the mobile terminal.

Figure 3:
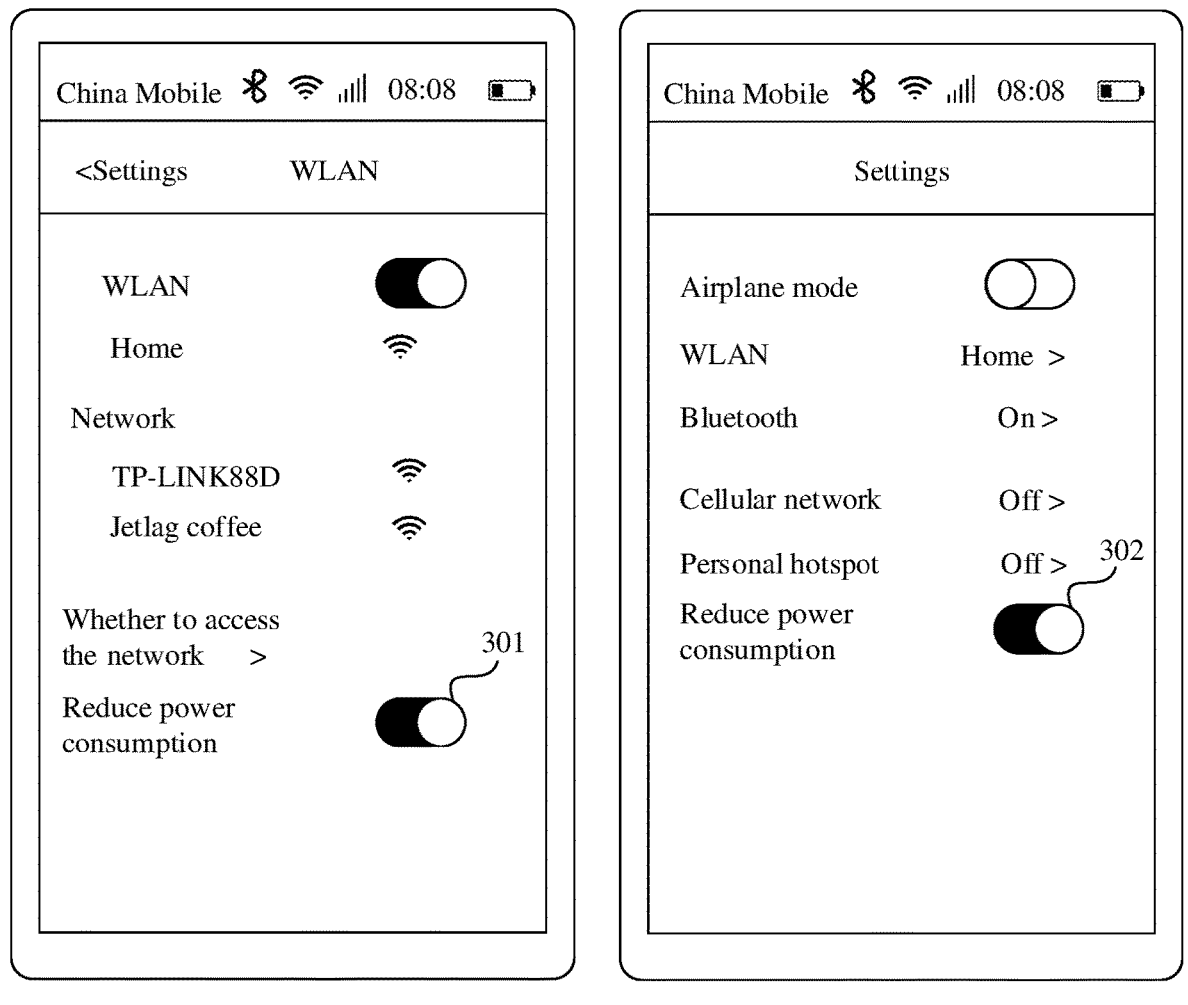
FIG. 3 is a schematic diagram of some user interfaces of a mobile terminal according to an embodiment of this application.

In some other examples, a switch may alternatively be disposed in a mobile terminal, and a user may manually enable or disable, by using the switch, a function of reducing power consumption of the mobile terminal provided in an embodiment of this application. For example, as shown in (1) in FIG. 3, a switch control 301 may be disposed on a "WLAN" setting page in the "Settings" application, to be used by the user to manually enable or disable the function of reducing power consumption of the mobile terminal. For another example, as shown in (2) in FIG. 3, a switch control 302 may be disposed in the "Settings" application, to be used by the user to manually enable or disable the function of reducing power consumption of the mobile terminal.

Figure 4:
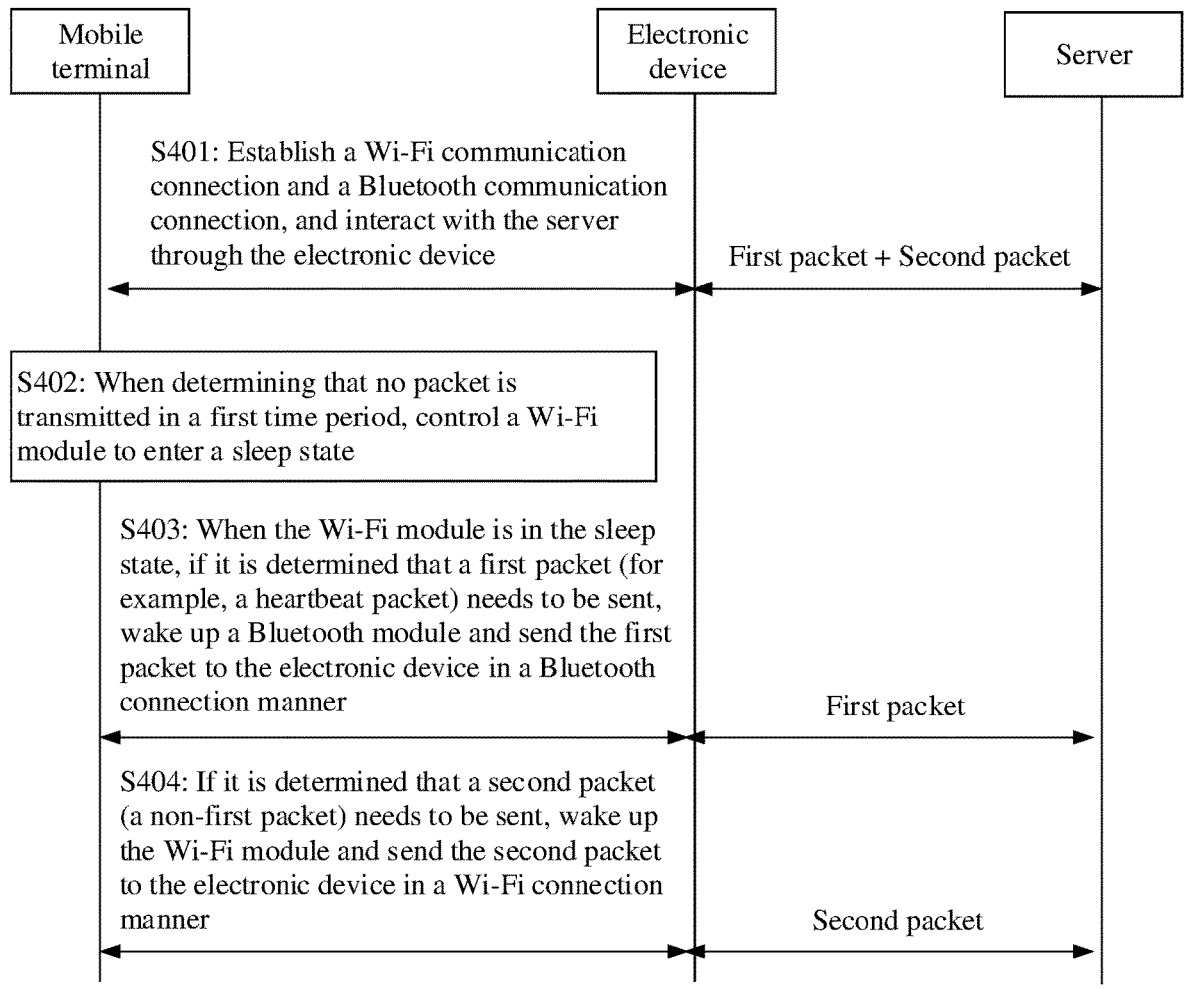
FIG. 4 is a schematic flowchart of a method for reducing power consumption of a mobile terminal according to an embodiment of this application.

FIG. 4 is a schematic flowchart of a method for reducing power consumption of a mobile terminal according to an embodiment of this application. Details are as follows:

S401: A mobile terminal establishes a Wi-Fi communication connection and a Bluetooth communication connection to an electronic device, and interacts with a server through the electronic device.

In some embodiments, after the mobile terminal automatically enables a power consumption reduction function or a user manually enables the power consumption reduction function, the mobile terminal may automatically enable or prompt the user to enable a Wi-Fi function and a Bluetooth function of the mobile terminal, and separately establish a Wi-Fi connection and a Bluetooth connection to the electronic device. The Bluetooth connection may be a classic Bluetooth connection, or may be a Bluetooth low energy (Bluetooth low energy, BLE) connection.

If the mobile terminal establishes the Wi-Fi connection to the electronic device for the first time, the user needs to select a Wi-Fi name corresponding to the electronic device, enter a password, and the like, or use another manner such as scanning a quick response code, to establish the Wi-Fi connection between the mobile terminal and the electronic device. If the mobile terminal establishes the Wi-Fi connection to the electronic device not for the first time, the mobile terminal stores information such as a Wi-Fi name corresponding to the electronic device and a password, and the mobile terminal may automatically establish the Wi-Fi connection to the electronic device.

Similar to establishing of the Wi-Fi connection, if the mobile terminal establishes a Bluetooth connection to the electronic device for the first time, the user needs to perform an operation such as selecting a Bluetooth name corresponding to the electronic device, and then the mobile terminal establishes the Bluetooth connection to the electronic device. If the mobile terminal has previously established a Bluetooth connection to the electronic device, the mobile terminal stores information such as a Bluetooth name corresponding to the electronic device, and subsequently the mobile terminal may automatically establish the Bluetooth connection to the electronic device.

In some other embodiments, when enabling the Wi-Fi function, the mobile terminal may also ask the user whether to enable the power consumption reduction function. If the user chooses to enable the power consumption reduction function, the mobile terminal may automatically enable or prompt the user to enable the Bluetooth function of the mobile terminal. A process in which the mobile terminal establishes the Wi-Fi connection and the Bluetooth connection to the electronic device is the same as that in the foregoing embodiment, and details are not described herein.

In some other embodiments, after enabling the Wi-Fi function and establishing the Wi-Fi connection to the electronic device, the mobile terminal may further determine whether the electronic device is a preset device. The preset device is a device that can support the method provided in this embodiment of this application and can establish a Wi-Fi connection and a Bluetooth connection to the mobile terminal. If the mobile terminal determines that the electronic device is a preset device, the mobile terminal automatically enables the power consumption reduction function, automatically enables the Bluetooth function, and establishes a Bluetooth connection to the electronic device.

In some other embodiments, after enabling both the Wi-Fi function and the Bluetooth function, the mobile terminal may further automatically enable the power consumption reduction function, or ask the user whether to enable the power consumption reduction function. For a process in which the mobile terminal establishes the Wi-Fi connection and the Bluetooth connection to the electronic device, refer to the foregoing embodiment. Details are not described herein.

It should be noted that, in some examples, after the mobile terminal and the electronic device establish a Wi-Fi connection and a Bluetooth connection, the mobile terminal first sends a packet to the electronic device by using the Wi-Fi connection, and then the electronic device sends the received packet to the server. Alternatively, the electronic device receives a packet to be sent to the mobile terminal from the server, and then the electronic device sends the packet to the mobile terminal by using the Wi-Fi connection. In other words, the mobile terminal communicates with the server through the electronic device. The mobile terminal communicates with the electronic device by using the Wi-Fi connection. In this process, the Bluetooth connection may be automatically disconnected because no packet is transmitted within a period of time. A Bluetooth module of the mobile terminal may also be in a sleep state. In some other examples, when the mobile terminal transmits a packet by using the Wi-Fi connection, the mobile terminal may alternatively retain the Bluetooth connection to the electronic device. In some other examples, after the mobile terminal establishes the Wi-Fi connection to the electronic device, both the mobile terminal and the electronic device enable the Bluetooth function, but no Bluetooth connection is established in this case. However, it should be noted that a connection has been previously established between the mobile terminal and the electronic device. In other words, in this case, both the mobile terminal and the electronic device store information such as a Bluetooth address of each other, so that the mobile terminal and the electronic device can quickly establish a connection and transmit a packet subsequently.

S402: When determining that no packet is transmitted in a first time period, the mobile terminal controls a Wi-Fi module to enter a sleep state.

That the Wi-Fi module enters the sleep state may also be understood as that the Wi-Fi module is in a low power consumption working mode. In the low power consumption working mode, most functions of the Wi-Fi module are suspended to reduce power consumption of the entire Wi-Fi module. For example, that the Wi-Fi module enters the sleep state includes that the Wi-Fi module is in a sleep mode or a deep sleep mode. In the sleep mode, a system running clock of the mobile terminal remains unchanged, the Wi-Fi module may be woken up by using a serial port or a network data packet, and a GPIO (General Purpose Input Output) port keeps outputting. In the deep sleep mode, the system running clock of the mobile terminal is reduced to half, the Wi-Fi module may be woken up by using a serial port or a network data packet, the GPIO port keeps outputting, and a wakeup response time is slightly longer than that in the sleep mode.

When the mobile terminal neither sends a packet to the electronic device nor receives a packet from the electronic device within the first time period, the mobile terminal may control the Wi-Fi module of the mobile terminal to enter the sleep state, to reduce the power consumption of the Wi-Fi module. In an example, when the mobile terminal does not need to send or receive any packet within the first time period, that is, when the mobile terminal does not need to send or receive the following second packet (for example, a packet related to a service of each application on the mobile terminal) and the following first packet (for example, a heartbeat packet of an application or a packet used to establish a transport layer link), the mobile terminal may control the Wi-Fi module of the mobile terminal to enter the sleep state. In another example, when the mobile terminal does not need to send or receive the following second packet (for example, a packet related to a service of each application on the mobile terminal) within the first time period, the mobile terminal may control the Wi-Fi module of the mobile terminal to enter the sleep state. In other words, when the mobile terminal needs to send only a first packet within the first time, the mobile terminal may also control the Wi-Fi module of the mobile terminal to enter the sleep state, wake up the Bluetooth module, and transmit the first packet by using the Bluetooth module.

For example, when the mobile terminal is in a screen-on state, the application on the mobile terminal does not request a packet from the server through the electronic device, and the server does not send a packet to the mobile terminal through the electronic device. In this case, after the first time period, the mobile terminal may disconnect the Wi-Fi connection to the electronic device, and control the Wi-Fi module of the mobile terminal to enter the sleep state.

For another example, when the mobile terminal does not receive an operation of the user within a specific time period, and the mobile terminal does not run an application such as a video application, the mobile terminal turns off a screen and enters a screen-off state. When the mobile terminal is in the screen-off state and the mobile terminal does not run an audio-related application, after the first time period, the mobile terminal may disconnect the Wi-Fi connection to the electronic device, and control the Wi-Fi module of the mobile terminal to enter the sleep state.

S403: When the Wi-Fi module is in the sleep state, if the mobile terminal determines that a first packet needs to be sent, the mobile terminal wakes up the Bluetooth module and sends the first packet to the electronic device in a Bluetooth connection manner, and then the electronic device sends the first packet to the server. The first packet is a heartbeat packet of an application on the mobile terminal, or a packet used to establish a transport layer link. The heartbeat packet is a heartbeat packet exchanged between an application on the mobile terminal and a server corresponding to the application, and may include a heartbeat request sent by the mobile terminal to the server, and a heartbeat response returned by the server to the mobile terminal.

As described above, before step S403, a Bluetooth connection (for example, a BLE connection) has been established between the mobile terminal and the electronic device. The mobile terminal and the electronic device separately store information such as a Bluetooth address of each other. After determining that the first packet needs to be sent, the mobile terminal may wake up the Bluetooth module and establish a Bluetooth connection to the electronic device. Then, the first packet is sent to the electronic device by using the Bluetooth connection, so that the electronic device further sends the first packet to the server. Alternatively, the mobile terminal and the electronic device always retain a Bluetooth connection, and in this case, the first packet may be directly transmitted by using the Bluetooth connection.

It should be noted that the mobile terminal maintains information about a Wi-Fi connection and a Bluetooth connection to the electronic device. To be specific, the mobile terminal may ensure that when sending the first packet, the mobile terminal may automatically connect to the Bluetooth connection corresponding to the electronic device and send the first packet to the electronic device, and avoid connecting to another electronic device and sending the first packet to the another electronic device, thereby ensuring packet transmission security.

In some embodiments of this application, the first packet is a heartbeat packet that needs to be transmitted between the mobile terminal and the electronic device. When the mobile terminal is in the sleep state, each application running on the mobile terminal still needs to periodically send a heartbeat packet to a server corresponding to the application, so as to notify the server that the application is online. In the conventional technology, when an application running on the mobile terminal needs to send a heartbeat packet to a server, the mobile terminal wakes up the Wi-Fi module, establishes a Wi-Fi connection to the electronic device, and sends the heartbeat packet by using the Wi-Fi connection. When many applications run on the mobile terminal, there are more occasions for sending a heartbeat packet. Therefore, there are also more occasions for waking up the Wi-Fi module. In other words, the Wi-Fi module remains in a working state for a longer time, and power consumption is high.

However, in this embodiment of this application, when determining that an application of the mobile terminal needs to send a heartbeat packet, the mobile terminal may not wake up the Wi-Fi module, but wakes up the Bluetooth module with lower power consumption (compared with the Wi-Fi module), and sends the heartbeat packet by using the Bluetooth connection. Therefore, overall power consumption of the mobile terminal can be reduced.

In some other embodiments of this application, the mobile terminal may alternatively collect heartbeat packets that need to be sent by various applications, and send the heartbeat packets in a centralized manner in a specific time period. When the heartbeat packets are sent in the centralized manner, the Bluetooth module is woken up, and the heartbeat packets are sent to the electronic device by using the Bluetooth connection. Then, the electronic device sends the heartbeat packets to servers corresponding to the applications.

In some other embodiments of this application, the first packet may alternatively be a packet (such as a device ID, a device IP address, a port number and information about a used protocol, or a TCP link establishment packet) used to establish a transport layer link by the mobile terminal. In some scenarios, the mobile terminal may transmit, by using a Bluetooth link, the packet used to establish a transport layer link. It should be noted that in this case, only a physical layer link is established for the Bluetooth link, and no transport layer link is established. For example, a control packet (such as a packet used to broadcast an address of the mobile terminal) between the mobile terminal and the electronic device may carry a packet of the transport layer link. In other words, the transport layer link may be established in advance. For example, the transport layer link may be established periodically. Subsequently, when the mobile terminal needs to establish a Bluetooth link or a Wi-Fi link, after establishing a corresponding physical layer link, the mobile terminal may directly use the transport layer link established in advance. Because the transport layer link is established in advance, after the mobile terminal wakes up the Wi-Fi module or the Bluetooth module, packet transmission may be quickly started, thereby improving work efficiency of the Wi-Fi module or the Bluetooth module, and helping reduce power consumption of the Wi-Fi module or the Bluetooth module. Therefore, the overall power consumption of the mobile terminal is reduced.

It should be noted that, in some examples, after the mobile terminal wakes up the Bluetooth module to transmit the first packet, if no first packet is transmitted within a period of time, the mobile terminal controls the Bluetooth module to disconnect the Bluetooth connection to the electronic device and enter the sleep state, to reduce power consumption. Alternatively, in some scenarios, first packets are periodically sent in a centralized manner in a period of time. For example, heartbeat packets of a plurality of applications are periodically sent in a centralized manner in a period of time. In this case, after determining that all first packets in a cycle are sent, the mobile terminal may directly control the Bluetooth module to disconnect the Bluetooth connection to the electronic device, enter the sleep state, and wait for a next cycle. In other words, after sending first packets of one cycle, the mobile terminal does not need to wait for a period of time to disconnect the Bluetooth connection to the electronic device. This helps further reduce power consumption of the Bluetooth module. In some other examples, after the mobile terminal wakes up the Bluetooth module to transmit the first packet, the mobile terminal may not disconnect the connection. In other words, the mobile terminal and the electronic device retain the Bluetooth connection for a long time.

S404: If the mobile terminal determines that a second packet needs to be sent, the mobile terminal wakes up the Wi-Fi module and sends the second packet to the electronic device in a Wi-Fi connection manner, and then the electronic device sends the second packet to the server. Alternatively, when determining that the server delivers, to the electronic device, a second packet to be sent to the mobile terminal, the electronic device restores the Wi-Fi connection to the mobile terminal. In this scenario, the mobile terminal wakes up the Wi-Fi module, and receives, in the Wi-Fi connection manner, the second packet sent by the electronic device.

The second packet is another packet that is different from the first packet and that needs to be sent by the mobile terminal, and may include a packet (for example, service data) related to a service of each application on the mobile terminal.

In some embodiments of this application, if the mobile terminal still retains the Bluetooth connection to the electronic device when the mobile terminal determines that a second packet needs to be sent, the mobile terminal may actively disconnect the Bluetooth connection, establish a Wi-Fi connection, and send the second packet in the Wi-Fi connection manner. In some examples, if the mobile terminal still needs to send a first packet to the electronic device in this case, the mobile terminal may also send the first packet in the Wi-Fi connection manner, and then sends the second packet. In some other examples, if the mobile terminal determines that the first packet is a packet with a low latency requirement or a non-important packet (for example, a packet used to establish a physical layer link), the mobile terminal may first send the second packet in the Wi-Fi connection manner, and then send the first packet or directly discard the first packet.

In some other embodiments of this application, when the mobile terminal retains the Wi-Fi connection to the electronic device, if the mobile terminal detects that the mobile terminal needs to send a first packet, the mobile terminal may directly perform transmission by using the Wi-Fi connection.

The following describes the method provided in this embodiment of this application by using examples with reference to specific scenarios.

Scenario 1: The mobile terminal (for example, a mobile phone, a tablet computer, or a smart speaker) establishes a Wi-Fi connection to a wireless router, and accesses a network by using the wireless router. Bluetooth functions of the mobile terminal and the wireless router are enabled, and a Bluetooth connection has been previously established between the mobile terminal and the wireless router.

In an example, if the mobile terminal does not transmit any packet (including a heartbeat packet) in the first time period, the mobile terminal disconnects the Wi-Fi connection to the wireless router, and controls the Wi-Fi module configured in the mobile terminal to enter the sleep state. In another example, if the mobile terminal does not need to transmit a packet (namely, a second packet) other than a heartbeat packet in the first time period, the mobile terminal disconnects the Wi-Fi connection to the wireless router, and controls the Wi-Fi module configured in the mobile terminal to enter the sleep state. When the mobile terminal needs to transmit only a heartbeat packet in the first time period, the mobile terminal may alternatively wake up the Bluetooth module, and send the heartbeat packet in the Bluetooth connection manner.

When the Wi-Fi module configured in the mobile terminal is in the sleep state, if the mobile terminal detects that an application running on the mobile terminal needs to send a heartbeat packet (no other packets), the mobile terminal wakes up the Bluetooth module configured in the mobile terminal, establishes a Bluetooth connection (for example, BLE) to the electronic device, and sends the heartbeat packet by using the Bluetooth connection. For a process in which the mobile terminal establishes the Bluetooth connection to the electronic device after waking up the Bluetooth module, refer to related technologies in the art, and details are not described herein. In some examples, after the heartbeat packet is sent, if no packet is transmitted by the mobile terminal in a second time period, the mobile terminal disconnects the Bluetooth connection to the wireless router, and controls the Bluetooth module configured in the mobile terminal to enter the sleep state.

If an application on the mobile terminal needs to send a packet (a non-heartbeat packet, for example, a service-related packet of the application), the mobile terminal wakes up the Wi-Fi module of the mobile terminal, establishes a Wi-Fi connection to the electronic device, and sends the packet by using the Wi-Fi connection. For a process in which the mobile terminal establishes the Wi-Fi connection to the electronic device after waking up the Wi-Fi module, refer to related technologies in the art, and details are not described herein.

If the wireless router needs to send, to the mobile terminal, a packet (non-heartbeat packet) from the server, the wireless router establishes a Wi-Fi connection to the mobile terminal, and sends the packet to the mobile terminal by using the Wi-Fi connection. For a process in which the wireless router establishes the Wi-Fi connection to the electronic device, refer to related technologies in the art, and details are not described herein.

Scenario 2: The mobile terminal (for example, a mobile phone, a tablet computer, or a smart speaker) establishes a Wi-Fi connection to an accompanying Wi-Fi device, and accesses a network by using the accompanying Wi-Fi device. Bluetooth functions of the mobile terminal and the accompanying Wi-Fi device are enabled, and a Bluetooth connection has been previously established between the mobile terminal and the accompanying Wi-Fi device.

Different from scenario 1, the accompanying Wi-Fi device is also a mobile terminal and is configured with a Wi-Fi module, and power consumption of the Wi-Fi module is one type of main power consumption of the accompanying Wi-Fi device. The accompanying Wi-Fi device is further configured with a mobile communication module, which may be configured to provide a wireless communication solution that is applied to the accompanying Wi-Fi device and that includes 2G/3G/4G/5G or the like. In other words, the mobile terminal interacts with the accompanying Wi-Fi device by using the Wi-Fi connection, and accesses the mobile communications network by using the mobile communication module of the accompanying Wi-Fi device, to implement a network access function.

If a mobile terminal is connected to the accompanying Wi-Fi device, when determining that there is no packet transmission with the mobile terminal, the accompanying Wi-Fi device may also control the Wi-Fi module of the accompanying Wi-Fi device to enter the sleep state. Subsequently, when the accompanying Wi-Fi device receives a packet delivered by a network side and needs to send the packet to the mobile terminal, the accompanying Wi-Fi device wakes up the Wi-Fi module, and establishes a Wi-Fi connection to the mobile terminal, to transmit the packet delivered by the network side.

Figure 5A:
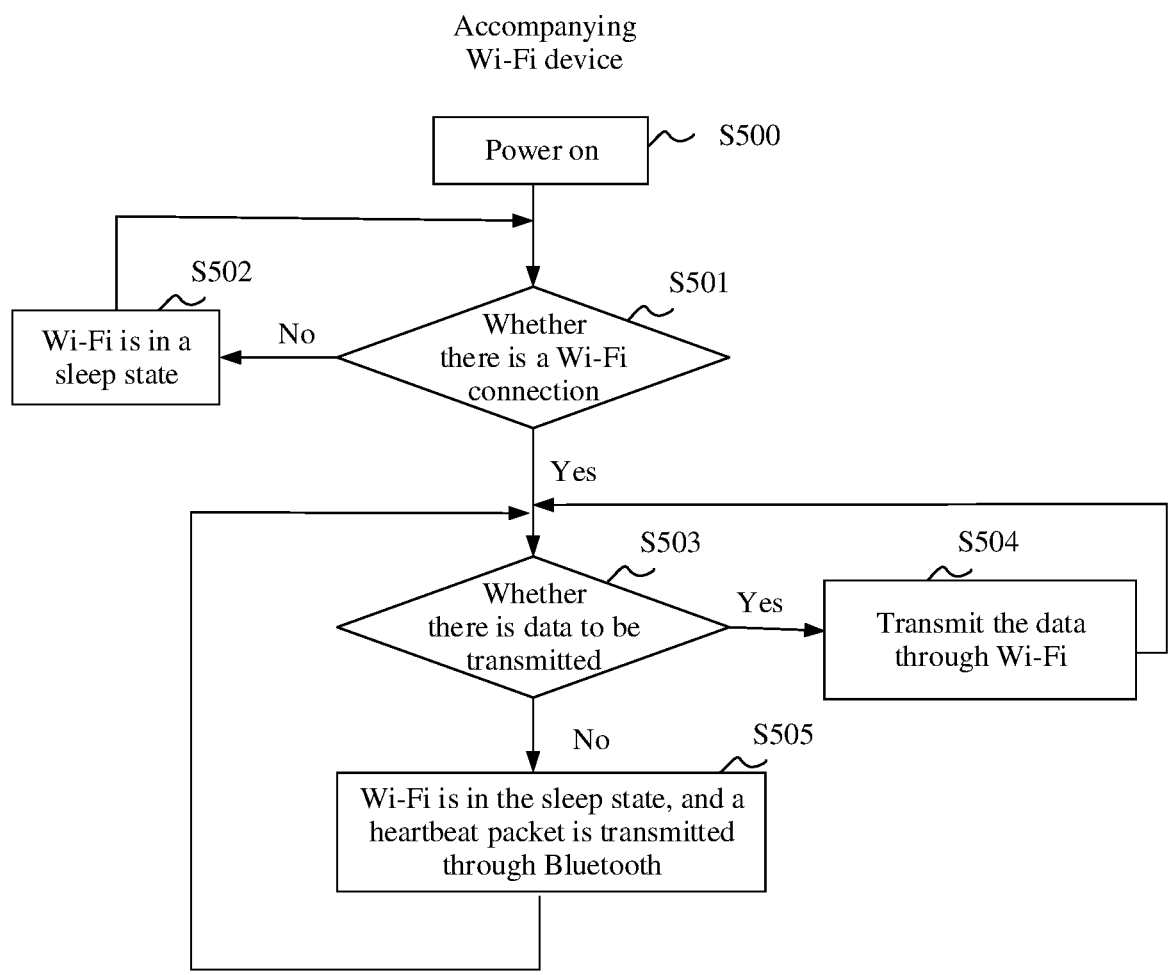
FIG. 5A is a schematic flowchart of another method for reducing power consumption of a mobile terminal according to an embodiment of this application.
Figure 5B:
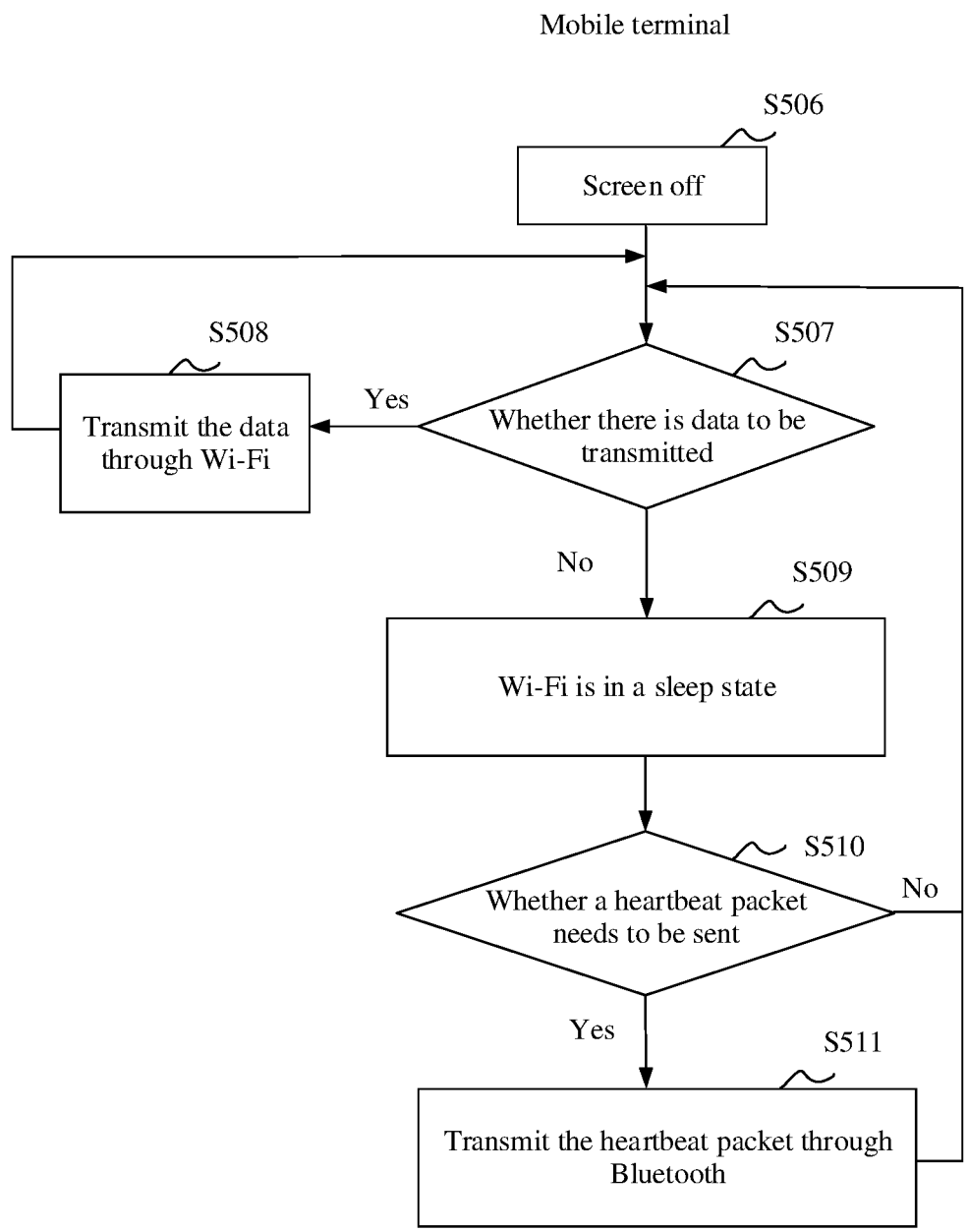
FIG. 5B is a schematic flowchart of another method for reducing power consumption of a mobile terminal according to an embodiment of this application.

An example in which the accompanying Wi-Fi device is connected to one mobile terminal is used for description. FIG. 5A and FIG. 5B are a schematic flowchart of another method for reducing power consumption of a mobile terminal according to an embodiment of this application. Details are as follows:

Referring to FIG. 5A first, from a side of the accompanying Wi-Fi device, the method for reducing power consumption of a mobile terminal includes step S500 to step S505, which are as follows:

S500. Power on the accompanying Wi-Fi device.

S501. The accompanying Wi-Fi device determines whether there is a Wi-Fi connection to another mobile terminal. If the accompanying Wi-Fi device determines that there is no Wi-Fi connection for a period of time, the accompanying Wi-Fi device performs step S502. If the accompanying Wi-Fi device determines that there is a Wi-Fi connection, the accompanying Wi-Fi device performs step S503.

S502. The accompanying Wi-Fi device controls a Wi-Fi module to enter a sleep state.

The Wi-Fi module enters the sleep state, which helps reduce power consumption of the accompanying Wi-Fi device. Then, the accompanying Wi-Fi device continues to monitor whether there is a Wi-Fi connection, that is, perform step S501.

S503. The accompanying Wi-Fi device determines whether data (a non-heartbeat packet) needs to be transmitted in a first time period. If data needs to be transmitted, the accompanying Wi-Fi device performs step S504. If no data needs to be transmitted, the accompanying Wi-Fi device performs step S505.

For example, the accompanying Wi-Fi device specifically determines whether the accompanying Wi-Fi device receives, from a network side device in the first time period, data that needs to be sent to the mobile terminal, or whether the accompanying Wi-Fi device receives, from the mobile terminal, data that needs to be sent to the network side.

S504. The accompanying Wi-Fi device transmits the data by using a Wi-Fi connection to the mobile terminal.

Then, the accompanying Wi-Fi device continues to monitor whether data needs to be transmitted, that is, perform step S503.

S505. The accompanying Wi-Fi device controls the Wi-Fi module to enter the sleep state, and transmits a heartbeat packet by using a Bluetooth connection to the mobile terminal.

When determining that the heartbeat packet needs to be sent, the accompanying Wi-Fi device wakes up a Bluetooth module (wakeup is not required if the Bluetooth module is not in a sleep state), and transmits the heartbeat packet by using a Bluetooth connection (for example, a BLE connection) between the accompanying Wi-Fi device and the mobile terminal. Then, the accompanying Wi-Fi device continues to monitor whether data needs to be transmitted, that is, perform step S503. It should be noted that, after step S503, if the accompanying Wi-Fi device determines that data needs to be transmitted, before step S504, if the Wi-Fi module is in the sleep state, the accompanying Wi-Fi device first wakes up the Wi-Fi module, and then transmits the data by using the Wi-Fi module.

Referring to FIG. 5B, from a side of the mobile terminal, the method for reducing power consumption of a mobile terminal includes step S506 to step S511, which are as follows:

S506. The mobile terminal is in a screen-off state.

If the mobile terminal is not in the screen-off state, there is a relatively high probability that the mobile terminal is in a data transmission scenario or is not in a low power consumption scenario. Therefore, an example in which the mobile terminal is in the screen-off state is used for description herein.

S507. The mobile terminal determines whether data (a non-heartbeat packet) needs to be transmitted in the first time period. If data needs to be transmitted, the mobile terminal performs step S508. If no data needs to be transmitted, the mobile terminal performs step S509.

For example, the mobile terminal determines whether the mobile terminal has data that needs to be sent to the accompanying Wi-Fi device.

S508. The mobile terminal transmits the data by using a Wi-Fi connection provided by a Wi-Fi module to the accompanying Wi-Fi device.

Then, the mobile terminal continues to monitor whether data needs to be transmitted, that is, perform step S507.

S509. The mobile terminal controls the Wi-Fi module to enter the sleep state.

S510. The mobile terminal determines whether a heartbeat packet needs to be transmitted. If a heartbeat packet needs to be sent, the mobile terminal performs step S511. If no heartbeat packet needs to be sent, the mobile terminal performs step S507.

S511. The mobile terminal transmits the heartbeat packet by using a Bluetooth connection to the accompanying Wi-Fi device.

The mobile terminal may wake up a Bluetooth module (wakeup is not required if the Bluetooth module is not in a sleep state), and transmit the heartbeat packet by using the Bluetooth connection (for example, a BLE connection) to the accompanying Wi-Fi device. Then, the mobile terminal performs step S507. It should be noted that, after step S507, if the mobile terminal determines that data needs to be transmitted, before step S508, if the Wi-Fi module is in the sleep state, the mobile terminal first wakes up the Wi-Fi module, and then transmits the data by using the Wi-Fi module.

In this embodiment of this application, when only a heartbeat packet needs to be transmitted between the accompanying Wi-Fi device and the mobile terminal, the accompanying Wi-Fi device and the mobile terminal transmit the heartbeat packet by using a Bluetooth connection provided by a Bluetooth module with lower power consumption (compared with a Wi-Fi module). A probability that the accompanying Wi-Fi device and the mobile terminal separately wake up their respective Wi-Fi modules is reduced as a whole, a working time of either Wi-Fi module is reduced, and power consumption of the accompanying Wi-Fi device and power consumption of the mobile terminal are reduced.

In other words, in this scenario, in addition to the power consumption of the mobile terminal, the power consumption of the accompanying Wi-Fi device may be reduced, and a standby time of the accompanying Wi-Fi device is prolonged.

If N mobile terminals are connected to the accompanying Wi-Fi device, when determining that there is no packet transmission with all the N mobile terminals connected to the accompanying Wi-Fi device, the accompanying Wi-Fi device controls the Wi-Fi module of the accompanying Wi-Fi device to enter the sleep state. Subsequently, when determining that any one or more of the N mobile terminals need to transmit only a heartbeat packet, the accompanying Wi-Fi device separately establishes a Bluetooth connection to the one or more mobile terminals, to transmit a heartbeat packet exchanged between each mobile terminal and the network side. When determining that any one or more of the N mobile terminals need to transmit data (a non-heartbeat packet), the accompanying Wi-Fi device wakes up the Wi-Fi module, and separately establishes a Wi-Fi connection to the one or more mobile terminals to transmit the data.

If Wi-Fi modules of M mobile terminals (M is greater than or equal to 1 and less than N) in the N mobile terminals enter the sleep state, the accompanying Wi-Fi device separately establishes Bluetooth connections (namely, M Bluetooth connections) to the M mobile terminals, and separately transmits, by using the M Bluetooth connections, heartbeat packets exchanged between each mobile terminal and the network side. It should be noted that the accompanying Wi-Fi device still uses a Wi-Fi connection to transmit a packet exchanged between the other (N-M) mobile terminals and the network side.

For other content of this scenario, refer to the description of scenario 1 and the foregoing related content. Details are not described herein.

Scenario 3: The mobile terminal (for example, a mobile phone, a tablet computer, or a smart speaker) accesses a network by using a hotspot provided by another mobile terminal (for example, a mobile phone, a tablet computer, or a smart speaker). Bluetooth functions of the two mobile terminals are enabled, and a Bluetooth connection has been previously established between the two mobile terminals.

For details about this scenario, refer to the description of related content in other scenarios.

Figure 6:
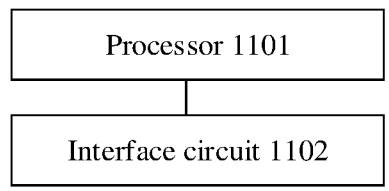
FIG. 6 is a schematic structural diagram of a chip system according to an embodiment of this application.

An embodiment of this application further provides a chip system. As shown in FIG. 6, the chip system includes at least one processor 1101 and at least one interface circuit 1102. The processor 1101 and the interface circuit 1102 may be interconnected by using a line. For example, the interface circuit 1102 may be configured to receive a signal from another apparatus (for example, a memory of a mobile terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, the mobile terminal may perform steps performed by the mobile terminal 100 (for example, a mobile phone) in the foregoing embodiment. Certainly, the chip system may further include another discrete device. This is not specifically limited in this embodiment of this application.

An embodiment of this application further provides an apparatus. The apparatus is included in a mobile terminal or an electronic device, and the apparatus has a function of implementing behavior of the mobile terminal or the electronic device in any method in the foregoing embodiments. The function may be implemented by hardware, or may be implemented by hardware executing corresponding software. The hardware or the software includes at least one module or unit corresponding to the foregoing function, for example, a detection module or unit, or a determining module or unit.

An embodiment of this application further provides a computer readable storage medium, including computer instructions. When the computer instructions are run on a mobile terminal or an electronic device, the mobile terminal or the electronic device performs any method in the foregoing embodiments.

An embodiment of this application further provides a computer program product. When the computer program product runs on a computer, the computer performs any method in the foregoing embodiments.

It may be understood that, to implement the foregoing functions, the terminal includes a corresponding hardware structure and/or software module for performing each function. A person of ordinary skill in the art should easily be aware that, in combination with units and algorithm steps of the examples described in the embodiments disclosed in this specification, the embodiments of this application may be implemented by hardware or a combination of hardware and computer software. Whether the functions are performed by hardware or hardware driven by computer software depends on particular application and a design constraint of the technical solutions. A person skilled in the art may use different methods to implement the described functions for each particular application, but it should not be considered that the implementation goes beyond the scope of the embodiments of the present invention.

In the embodiments of this application, function module division may be performed on the terminal or the like based on the foregoing method example. For example, each function module may be obtained through division based on a corresponding function, or two or more functions may be integrated into one processing module. The integrated module may be implemented in a form of hardware, or may be implemented in a form of a software function module. It should be noted that, in the embodiments of the present invention, module division is an example, and is merely logical function division. In an actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement. In other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   establishing, by a mobile terminal, a Wi-Fi connection to an electronic device by using a Wi-Fi module of the mobile terminal, and interacting, by the mobile terminal, with a server by using the Wi-Fi connection;
   controlling, by the mobile terminal, the Wi-Fi module to enter a sleep state;
   determining, by the mobile terminal, to utilize a Bluetooth module to send a plurality of to-be-sent first packets associated with a plurality of applications of the mobile terminal, wherein the plurality of to-be-sent first packets are to be sent within a particular period of time; and
   while the Wi-Fi module is in the sleep state, when the mobile terminal has a to-be-sent first packet, sending, by the mobile terminal, the plurality of to-be-sent first packets to the electronic device using a Bluetooth connection established by the Bluetooth module of the mobile terminal, wherein each first packet is a heartbeat packet or a packet used to establish a transport layer link, wherein the method further comprises:
     after the Wi-Fi module enters the sleep state, when the mobile terminal has the plurality of to-be-sent first packets, and before sending, by the mobile terminal, the plurality of to-be-sent first packets by using the Bluetooth connection established by the Bluetooth module to the electronic device, receiving, by the mobile terminal, an indication for enabling a first function from a user, or enabling, by the mobile terminal, the first function in response to determining that a first condition is met, wherein the first function is a function of reducing power consumption of the mobile terminal, and the first condition comprises: a quantity of applications enabled by the mobile terminal is greater than a preset quantity, the mobile terminal being a predetermined device, and the mobile terminal enables any one or more of preset applications.

2. The method according to claim 1, further comprising:
   while the Wi-Fi module is in the sleep state, when the mobile terminal has the plurality of to-be-sent first packets, waking up, by the mobile terminal, the Bluetooth module, and establishing the Bluetooth connection to the electronic device using the Bluetooth module.

3. The method according to claim 1, further comprising:
   after the mobile terminal sends the plurality of to-be-sent first packets, when the mobile terminal does not send another packet within a second time period after sending the plurality of to-be-sent first packets, controlling the Bluetooth module to enter the sleep state.

4. The method according to claim 1, wherein the electronic device is any one of a wireless router, a Wi-Fi device, or a second mobile terminal with a hotspot capability.

5. The method according to claim 1, further comprising:
   after the Wi-Fi module enters the sleep state, when the mobile terminal has a to-be-sent second packet or a to-be-received second packet, waking up, by the mobile terminal, the Wi-Fi module, reestablishing the Wi-Fi connection between the mobile terminal and the electronic device by using the Wi-Fi module, and transmitting the to-be-sent second packet or the to-be-received second packet using the Wi-Fi connection, wherein the mobile terminal retains or disconnects the Bluetooth connection between the mobile terminal and the electronic device after the mobile terminal wakes up.

6. The method according to claim 1, wherein the heartbeat packet is exchanged between the mobile terminal and the server.

7. A computer readable storage medium, comprising computer instructions, wherein when the computer instructions are run on the mobile terminal, the mobile terminal performs the method according to claim 1.

8. The method according to claim 1, further comprising:
in response to determining to utilize the Bluetooth module to send the plurality of to-be-sent first packets, wake up, by the mobile terminal, the Bluetooth module; and
in response to determining that all packets of the plurality of to-be-sent first packets were sent, control, by the mobile terminal, the Bluetooth module to re-enter the sleep state.

9. The method according to claim 1, further comprising:
determining, by the mobile terminal, that the Bluetooth module is to be utilized based on a packet type of each packet in the plurality of to-be-sent first packets.

10. A method, comprising:
respectively establishing, by an electronic device, Wi-Fi connections to N mobile terminals using a Wi-Fi module of the electronic device, wherein the N mobile terminals interact with a server by using the Wi-Fi connections, and the electronic device establishes a communication connection to the server; and
in response to determining that all Wi-Fi modules of the N mobile terminals enter a sleep state, controlling, by the electronic device, the Wi-Fi module of the electronic device to enter the sleep state; and
in response to determining that Wi-Fi modules of M mobile terminals in the N mobile terminals enter the sleep state, respectively establishing, by the electronic device, Bluetooth connections to the M mobile terminals using a Bluetooth module of the electronic device, to transmit to-be-sent or to-be-received first packets of the M mobile terminals, wherein each first packet is a heartbeat packet or a packet used to establish a transport layer link, M and N are positive integers, and M is less than or equal to N, wherein the M mobile terminals establish the Bluetooth connections after determining that the Wi-Fi modules of the M mobile terminals enter the sleep state and before receiving, from the M mobile terminals, the to-be-sent or to-be-received first packets, and wherein the M mobile terminals further automatically establish the Bluetooth connection in response to an indication for enabling a first function from a user or enabling, by each mobile terminal of the M mobile terminals, the first function in response to determining that a first condition is met, wherein the first function is a function of reducing power consumption of the mobile terminal of the M mobile terminals, and the first condition comprises, for each mobile terminal of the M mobile terminals: a quantity of applications enabled by the mobile terminal is greater than a preset quantity, the mobile terminal being a predetermined device, and the mobile terminal enables any one or more of preset applications.

11. The method according to claim 10, wherein the electronic device is any one of a wireless router, an accompanying Wi-Fi device, or a mobile terminal with a hotspot capability.

12. The electronic device, comprising a processor, a memory, the Wi-Fi module, and the Bluetooth module, wherein the memory, the Wi-Fi module, and the Bluetooth module are coupled to the processor; the memory is configured to store computer program code; the computer program code comprises computer instructions; and when the processor reads the computer instructions from the memory, the electronic device performs the method according to claim 10.

13. The method according to claim 10, wherein the heartbeat packet is exchanged between the mobile terminal and the server.

14. A computer readable storage medium, comprising computer instructions, wherein when the computer instructions are run on the electronic device, the electronic device performs the method according to claim 10.

15. A chip system, comprising one or more processors, wherein when the one or more processors execute instructions, the electronic device is caused to perform the method according to claim 10.

16. An electronic device system, comprising one or more mobile terminals and the electronic device according to claim 10.

17. The method according to claim 10, wherein transmitting the to-be-sent or the to-be-received first packets of the M mobile terminals comprises:
transmitting a plurality of to-be-sent or a plurality of to-be-received first packets for at least one of the M mobile terminals, the plurality of to-be-sent or the plurality of to-be-received first packets corresponding to a plurality of applications of the at least one of the M mobile terminals.

18. A mobile terminal, comprising:
a processor;
a memory;
a touchscreen;
a Wi-Fi module; and
a Bluetooth module, wherein the memory, the touchscreen, the Wi-Fi module, and the Bluetooth module are coupled to the processor;
wherein the memory is configured to store computer program code, the computer program code comprises computer instructions executable by the processor, and when the computer instructions are executed, the mobile terminal is caused to:
establish a Wi-Fi connection to an electronic device by using the Wi-Fi module, and interacting, by the mobile terminal, with a server by using the Wi-Fi connection;
control the Wi-Fi module to enter a sleep state;
determine to utilize the Bluetooth module to send a plurality of to-be-sent first packets associated with a plurality of applications of the mobile terminal, wherein the plurality of to-be-sent first packets are to be sent within a particular period of time; and
while the Wi-Fi module is in the sleep state, when the mobile terminal has a to-be-sent first packet, send the plurality of to-be-sent first packets to the electronic device using a Bluetooth connection established by the Bluetooth module, wherein each first packet is a heartbeat packet or a packet used to establish a transport layer link, wherein when the computer instructions are executed, the mobile terminal is further caused to:
after the Wi-Fi module enters the sleep state, when the mobile terminal has the plurality of to-be-sent first packets, and before sending, by the mobile terminal, the plurality of to-be-sent first packets by using the Bluetooth connection established by the Bluetooth module to the electronic device, receive, by the mobile terminal, an indication for enabling a first function from a user, or enable, by the mobile terminal, the first function in response to determining that a first condition is met, wherein the first function is a function of reducing power consumption of the mobile terminal, and the first condition comprises: a quantity of applications enabled by the mobile terminal is greater than a preset quantity, the mobile terminal being a predetermined device, and the mobile terminal enables any one or more of preset applications.

\* \* \* \* \*